(No Model.)  5 Sheets—Sheet 1.
J. H. SIMPSON.
APPARATUS FOR MANUFACTURING DRAW BARS.
No. 328,435.  Patented Oct. 13, 1885.
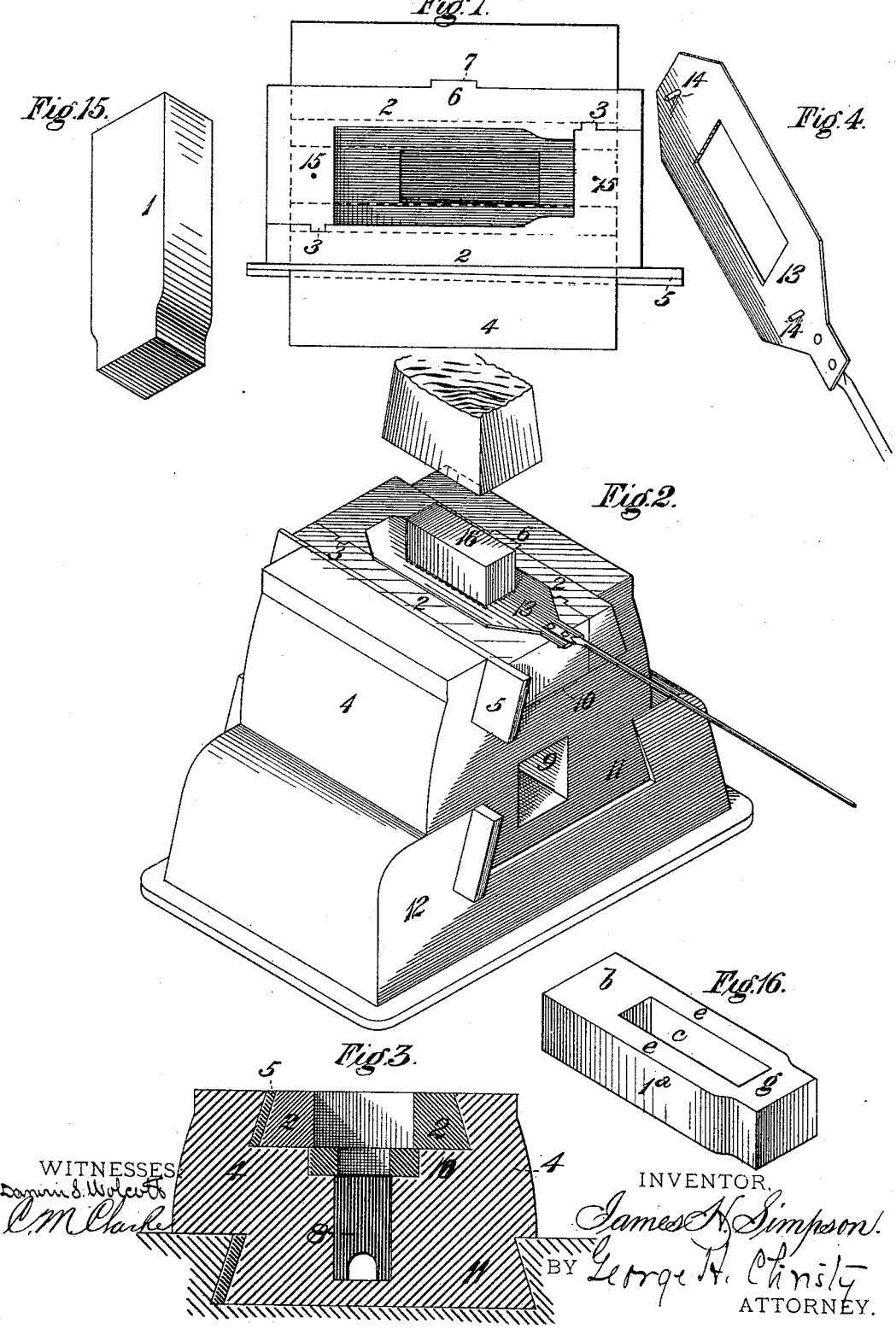

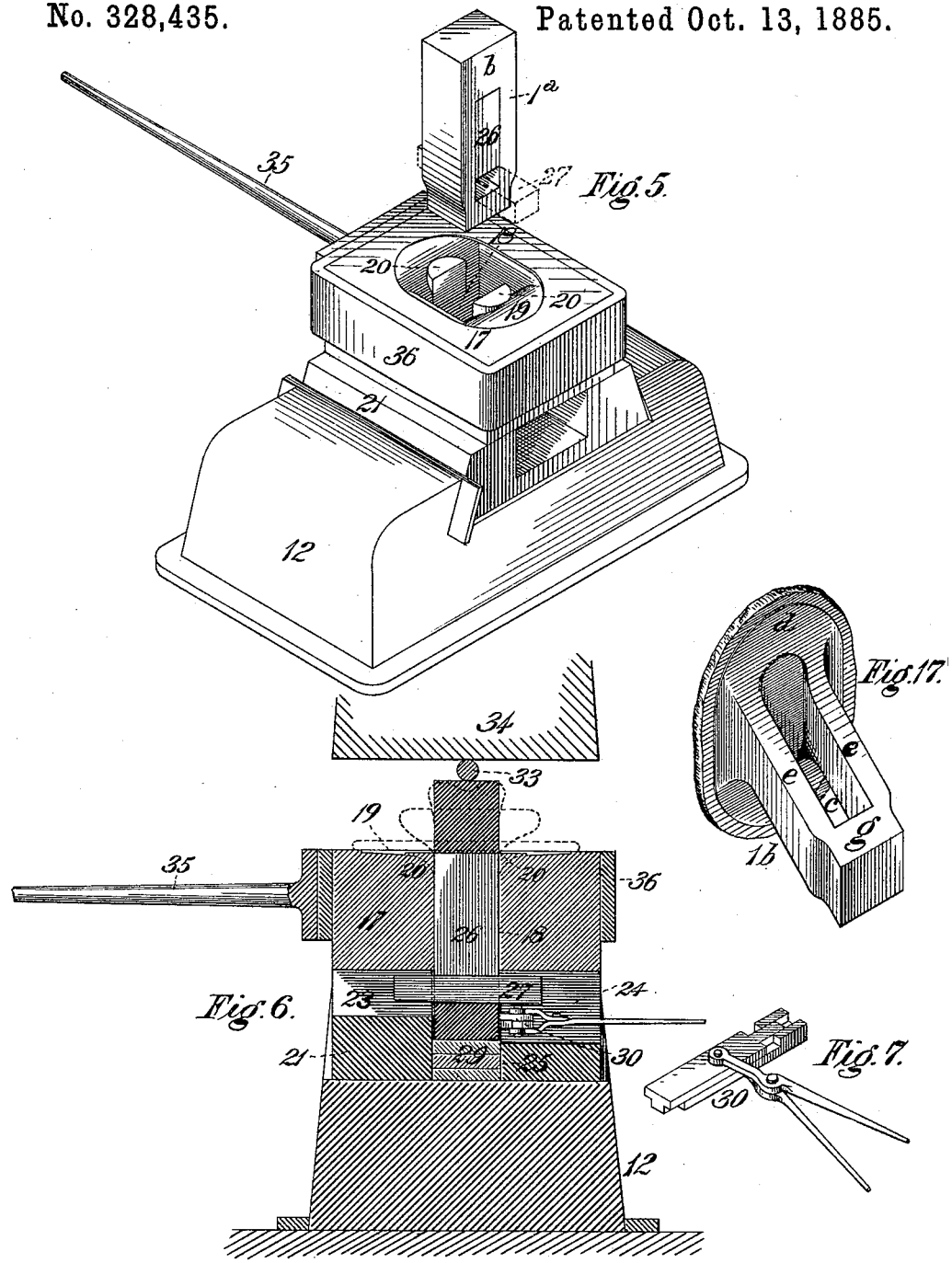

(No Model.) 5 Sheets—Sheet 3.
J. H. SIMPSON.
APPARATUS FOR MANUFACTURING DRAW BARS.
No. 328,435. Patented Oct. 13, 1885.
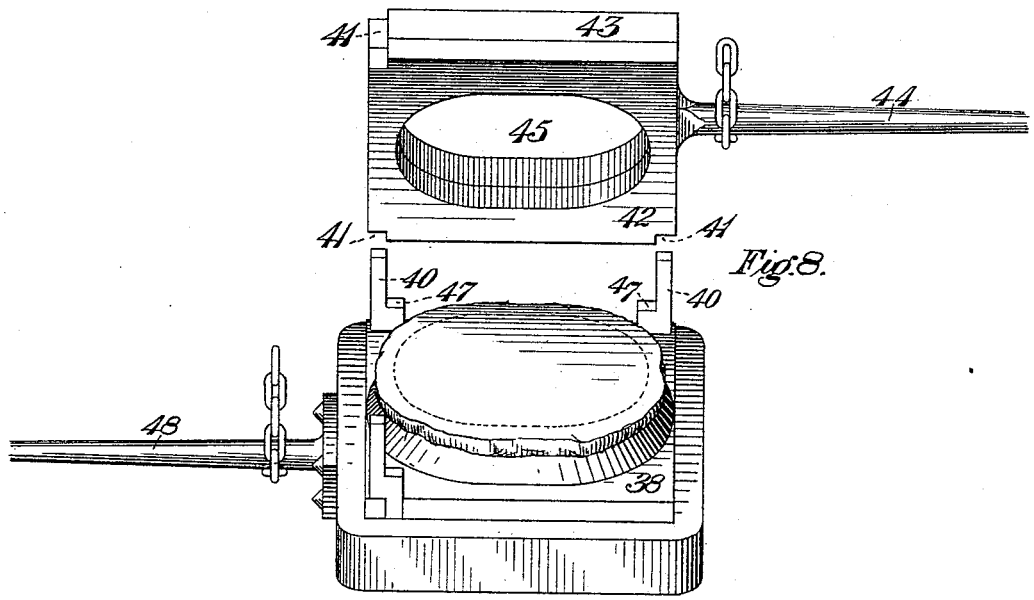
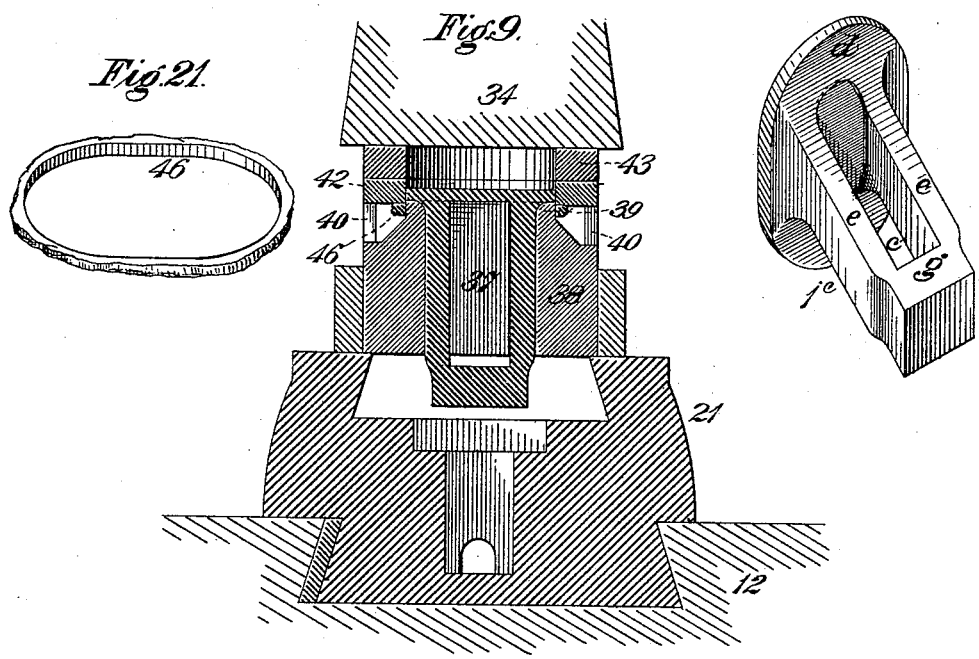
WITNESSES:
INVENTOR.

(No Model.) 5 Sheets—Sheet 4.
J. H. SIMPSON.
APPARATUS FOR MANUFACTURING DRAW BARS.
No. 328,435. Patented Oct. 13, 1885.
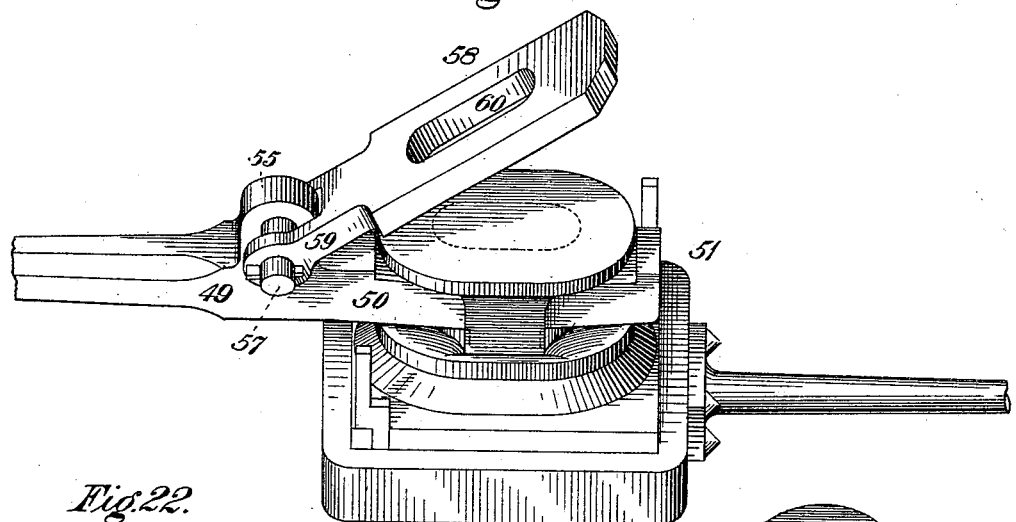
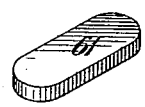
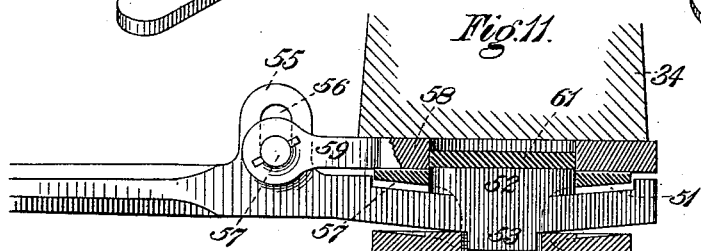
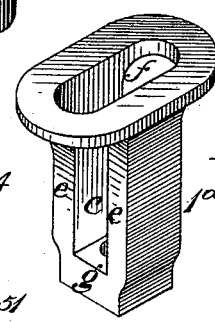
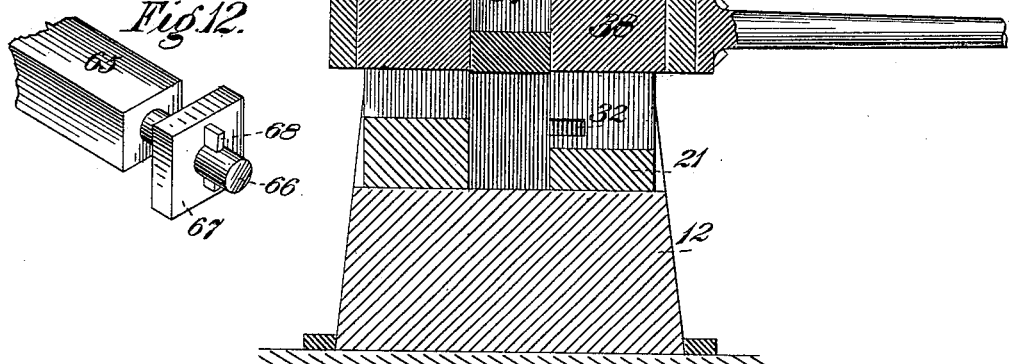
WITNESSES.
Darwin S. Wolcott
R. M. Clarke
INVENTOR.
James H. Simpson
BY George H. Christy
ATTORNEY.
N. PETERS, Photo-Lithographer, Washington, D. C.

(No Model.)  5 Sheets—Sheet 5.
J. H. SIMPSON.
APPARATUS FOR MANUFACTURING DRAW BARS.
No. 328,435.  Patented Oct. 13, 1885.
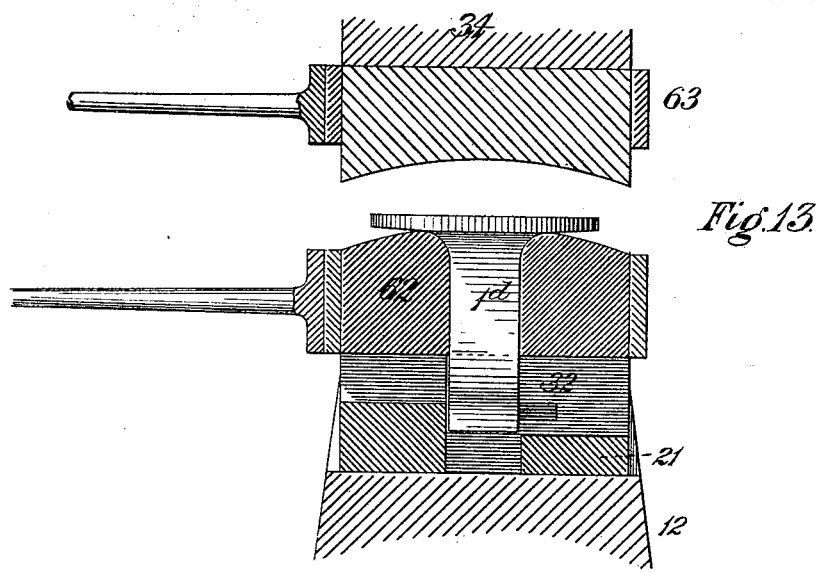
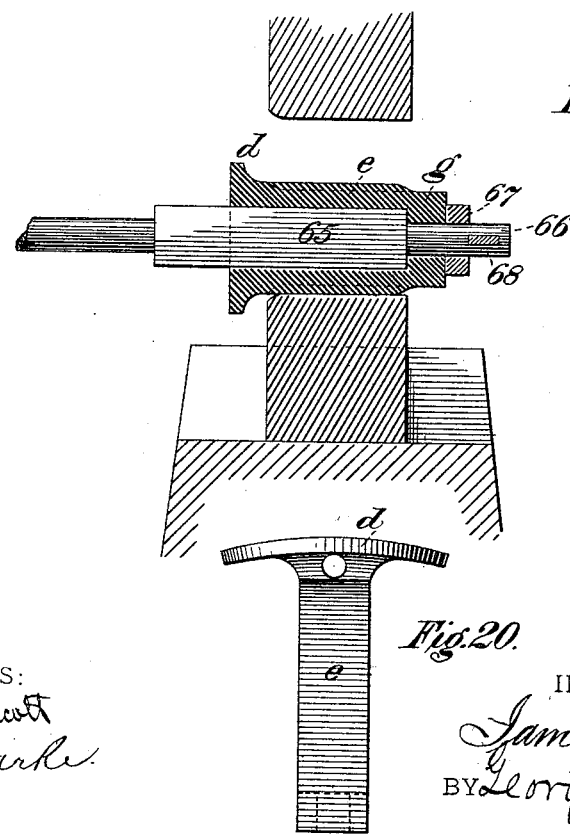
WITNESSES:
INVENTOR,

UNITED STATES PATENT OFFICE.

JAMES H. SIMPSON, OF PITTSBURG, PENNSYLVANIA, ASSIGNOR TO WILSON, WALKER & COMPANY, (LIMITED,) OF SAME PLACE.

APPARATUS FOR MANUFACTURING DRAW-BARS.

SPECIFICATION forming part of Letters Patent No. 328,435, dated October 13, 1885.

Application filed August 1, 1885. Serial No. 173,226. (No model.)

*To all whom it may concern:*

Be it known that I, JAMES H. SIMPSON, residing at Pittsburg, in the county of Allegheny and State of Pennsylvania, a citizen of the United States, have invented or discovered certain new and useful Improvements in Apparatus for Manufacturing Draw-Bars, of which improvement the following is a specification.

In the accompanying drawings, which make part of this specification, Figure 1 is a top plan view of the female blank-punching die. Fig. 2 is a perspective view of the female die, showing the gage and punch in place. Fig. 3 is a transverse sectional elevation of the female die. Fig. 4 is a perspective view of the punch-gage. Fig. 5, Sheet 2, is a perspective of the female die employed in forming the face-plate. Fig. 6 is a sectional elevation of the same, showing the blank in place and being operated on by the hammer. Fig. 7 is a perspective view of a compound key for holding the lower end of the blank in place. Fig. 8, Sheet 3, is a perspective view, and Fig. 9 a sectional elevation, of the dies employed for trimming the face-plate. Figs. 10 and 11, Sheet 4, are similar views of the apparatus employed for punching the link-opening in the face-plate. Fig. 12 is a perspective view of the operative end of the mandrel employed in drawing down the side straps. Fig. 13, Sheet 5, is a sectional elevation of the die and hammer for curving the face-plate. Fig. 14 is a similar view, showing the apparatus for drawing down the side straps. Figs. 15, 16, 17, 18, and 19 are perspective views showing the blank as operated on by the different dies. Fig. 20 is a top plan view of a completed draw-bar. Figs. 21 and 22 are views of the parts removed from the face-plate by the trimming and punch operations.

The invention herein relates to certain improvements in dies and other apparatus employed in forging solid steel draw-bars as distinguished from such draw-bars as are formed by welding together the several parts which are separately formed; and the invention consists in such a construction and combination of dies and other apparatus as to enable the progressive steps of forging, punching, and trimming to be successively and rapidly effected, all as more fully hereinafter described and claimed.

The steel blank 1, (see Fig. 15,) formed in any suitable manner, as by forging or casting, is, after being properly heated, placed in a box or holder, consisting in two similarly-constructed L-shaped pieces, 2, (see Figs. 1 and 2,) provided with interlocking tenons and grooves 3, adapted to retain said pieces in proper horizontal relation to each other. The sides of the pieces 2 are beveled or inclined so as to fit in the groove in the block 4, the walls of said groove being undercut as shown. The L-shaped pieces are retained in the groove by the wedge or key 5, and any longitudinal movement of the interlocked L-shaped pieces is prevented by the projection 6 formed on the side of one of said pieces and the slot 7 in one of the walls of the groove in the block 4. In the bottom of the groove in the block 4 is formed a vertical slot, 8, which intersects the longitudinal passage 9 in the lower portion of the block. The upper end of the slot 8 is enlarged, as shown in Fig. 3, for the reception of the slotted steel cutter 10. The block 4 is provided with a dovetailed projection, 11, adapted to fit a correspondingly-shaped recess in the anvil-block 12 of a steam-hammer. The blank 1 being placed in the box or holder, as above stated, the guide-plate 13 is placed over the blank and box, the position of the guide being regulated by pins 14 attached thereto and adapted to fit in holes 15 in the ends of the L-shaped pieces. This guide-plate is provided with a rectangular opening, in which is placed the steel punch 16, which is then forced through the blank by the blows of the steam-hammer, thus forming the blank 1ª, Fig. 16, the metal removed by the punch and the punch itself dropping through the slot 8 into the passage 9, from which they are removed by any suitable rod. After the punch 16 has been forced through the blank as above stated the L-shaped pieces 2, forming the box or holder, are separated sufficiently to permit of the withdrawal of the blank, the key or wedge 5 being backed out for the purpose.

The blank 1ª, formed as above stated, is again heated, especially the head portion, *b*, and is then inserted in a vertical position in the die 17. (See Figs. 5 and 6, Sheet 2.) This die is provided with a vertical opening, 18, of a size sufficient to admit what may be termed the "stem" of the blank 1ᵃ, but will, at the same time, prevent any lateral spreading of the stem during the operation on the head of the blank. In the face of the die 17 is formed an oval recess, 19, having a horizontal area equal to the size of the face-plate in the finished draw-bar, and of a depth somewhat less than the thickness of metal in such draw-bar. The vertical walls of the opening 18 curve outwardly at their upper ends, forming, in connection with the recess 19, a cavity corresponding in shape to the under side of the finished draw-bar. These curved walls are interrupted on two oppositely-disposed sides by the abutments 20, extending to the general level of the bottom of the recess 19, said abutments serving to prevent the spreading of the metal into the upper end of opening c of the blank 1ᵃ, formed by the punching operation above described.

The die 17, constructed as above described, rests upon a block, 21, provided with inclined sides adapted to fit and be secured in the dovetailed recess in the anvil of steam-hammer. In this block 21 is formed a transverse slot, 23, of width equal at least to the width of the vertical opening 18 in the die 17, said slot being enlarged at one end, as at 24, for a purpose to be hereinafter described. Midway of the slot 23, or in line with the opening 18 in the die 17 when said die is in place on the block, is formed a vertical opening, 25, for the reception of the lower end of the blank 1ᵃ.

As soon as the blank 1ᵃ has been properly heated it is removed from the furnace, and after the supporting-block 26 has been placed in the opening c is placed in the opening 18 in the die 17, the opening c being arranged in line with the abutments 20. The supporting-block is then keyed up in place by wedge 27, which is inserted between the lower end of the opening c and the block through the slots 23 24, as shown in Fig. 6. The lower end of the blank is supported by the filling-blocks 29, arranged in the opening 25 in the block 21. The lower end of the blank is prevented from displacement by the stop 30, consisting of two correspondingly-constructed and interlocking bars pivotally secured to the jaws of a pair of tongs, (see Fig. 7,) whereby said bars may be caused to slide along each other for the purpose of inserting the opposite ends of the stop into the holes 32 formed in the side walls of the slot 24 adjacent to the position of the lower end of the blank when in place. (See Figs. 6, 11, and 13.) The head b of the blank is then caused to spread out over the face of the die 17 by the blows of the hammer 34, as shown in Fig. 6, a spreading-bar, 33, being interposed between the hammer and the head b for the purpose of aiding in the spreading operation. During this operation of forming the face-plate d the straps e are prevented from bending or being stove up or upset by the supporting-block 26 and the sides of opening 18 in the die 17. It will be seen by an inspection of the blank 1′, Fig. 17, that the metal of the head b has been evenly spread or distributed on all sides by the operation of the hammer, and that a portion of the face-plate d has been forced into the recess 19 in the die 17, thereby partially severing such face-plate on the line on which the subsequent trimming operation is effected. This partial severance will prevent any finning during such trimming operation, as will be understood. The supporting-block 26 and the abutments 20, which during the hammering operation become parts or lateral extensions of said supporting-block, preserve the shape of the slot or opening c in the block and serve as a mandrel for the formation of a portion of the under side of the face d and the portions of the straps contiguous thereto. To remove the blank 1ᵇ the handles of the tongs of the stop 30 are brought together in order to shorten said stop to permit its removal from the holes 32 in the block 21. Then the wedge 27 is backed out. For convenience in handling the die 17, a handle, 35, is secured to the die by means of a strap, 36, passing around said die, as clearly shown in Figs. 5 and 6.

After the formation of the face-plate on the blank, as above described the blank 1ᵇ is again placed in the furnace and its face-plate reheated. It is then placed in the opening 37 in the die 38, the upper portion and face of said die being constructed to fit and support the under side of the face-plate. The outer upper portion of the die is cut away, as shown in Figs. 8 and 9, thereby forming a rim, 39, on which the face-plate d rests, the edge of said rim being made vertical for the purpose of aiding in trimming the edge of the face-plate. This die or cutter 38 is placed upon the block 21, described in connection with the die used in swaging the face-plate, or upon any other suitable block secured to the anvil of a steam-hammer, as shown in Fig. 9. This die 38 is provided at three of its corners with guide-pins 40, adapted to fit corresponding notches 41 in three corners of the movable die or cutter 42. This cutter, which is formed of hard steel, is secured to a wrought-iron or lower-grade-steel block, 43, provided with a handle, 44. Through the steel die and block is formed an opening, 45, corresponding in shape and size to the face-plate of the completed draw-bar, as does also the outer perimeter of the rim 39 on the die 38. The blank 1ᵇ having been heated and placed in position on the die 38, the movable die or cutter 42 is placed on the face-plate d, the pins 40 guiding the same into proper position. The holder 43 is then struck by the hammer, thereby causing the cutter 42, in connection with the rim 39, to shear off the outer periphery, 46, of the face-plate d. This operation on the blank 1ᵇ produces the blank 1ᶜ, having a face-plate of the desired area and thickness. The partial severance of the rim of the face-plate on its under side prevents the formation of fins or ragged edges during the above trimming operation.

To prevent any mutilation of the edge of the cutter 42 or the die, the pins 40 are provided with stops or shoulders 47, for the purpose of arresting the motion of the cutter as soon as the latter has effected its function. The die 38 is secured within a band or strap, 48, provided with a handle for convenience of manipulation.

The next operation (and this may be effected without reheating the blank) consists in punching out the link-opening $f$ in the face-plate $d$. This operation is effected by raising the blank, after it has been trimmed, partially out of the die 38, and then passing what I term the "mandrel" or "die-punch" 49 through the slot $c$ in the blank $1^c$. This mandrel (see Figs. 10 and 11) consists of an iron stem portion, 50, provided at its forward end with a recess, 51, of a length slightly greater than the major axis of the face-plate $d$, and within this recess is located the male die or punch 52, having a length and breadth equal to the length and breadth of the link-opening to be formed in the face-plate, and of a height above the bottom of the recess somewhat greater than the thickness of the metal of the face-plate, as clearly shown in Fig. 11. On the under side of the stem 50 is formed a shoulder or projection, 53, adapted to fit within the opening 37 in the die 38, the portions of the stem adjacent to the shoulder being supported on the abutments 54, said abutments corresponding to the abutments 20 of the die 17, above described. On the upper side of the mandrel, and in the rear of the recess 51, is formed a lug, 55, provided with a slot, 56, through which passes the pivot-pin 57 of the female die or punch 58, said punch being provided with perforated prongs 59, passing on opposite sides of the lug, as shown in Figs. 10 and 11. In the die 58 is formed a hole, 60, adapted for the reception of the punch 52.

The mandrel having been adjusted on the die 38, as above stated, the die or punch 58 is turned down upon the face-plate $d$, the slot 56 in the lug 55 being of sufficient length to permit the punch 58 to lie flat on the face-plate, and to move down in horizontal position when struck by the hammer. The downward movement of the punch 58 forces the rim of the face-plate down around the punch 52 and into the recess 51 of the mandrel, said punch forcing out the center 61 of the face-plate. If desired, this operation of forming the link-opening may precede that of trimming the face-plate above described, and in some cases such a reversal of the two operations is preferable.

After the face-plate has been punched, as above described, to form the link-opening $f$ the die 38 is removed from the block 21, and the die 62 (see Fig. 13) is substituted therefor. This die 62 is similar in construction to the die 38, except that the outer portions of its face are not cut away so abruptly, but its face is given a gradual downward and outward curve, as shown.

The blank $1^d$, after being heated, is placed in this die, as shown in Fig. 13, and on the face-plate of the blank is placed another die, 63, shaped to correspond in curvature to the face of the die 62. A few blows of the hammer on the back of the die 63, which is made straight, will cause the face-plate to assume a shape corresponding to that of the faces of the dies.

After imparting the desired curvature to the face-plate of the blank the latter is again heated for the purpose of drawing down and out the straps $e$; or, if desired, this latter operation may precede the stamping or swaging of the face-plate to shape. Previous, however, to heating the blank $1^d$ a hole is drilled through the end portion, $g$, of the blank for the purpose of securing the blank on the mandrel 65 during the drawing operation above mentioned, and also for the reception of the draw-bar bolt in securing the draw-bar to the car. After the blank $1^d$ has been properly heated it is slipped over the mandrel 65, provided with the pin 66 for insertion in the hole drilled in the end $g$ of blank $1^d$, which is secured in place on the mandrel by the washer 67 and key 68, passing through the end of the pintle beyond the washer. The operative portion of the mandrel is made of a width equal to the width of the straps $e$, and of a length equal to the height of the opening $c$ formed in the blank, as previously described. The mandrel, with the blank secured thereon, is transferred to a drop-hammer, whereby the straps are drawn down and out, as indicated by dotted lines in Fig. 14. Care should be taken during this last operation that the straps are not increased in width, the excess of metal in the straps of the blank being utilized in lengthening the straps to the length desired in the completed draw-bar. (Shown in Fig. 20.)

If desired, the punching of the face-plate may be effected immediately after the face-plate has been formed, the mandrel or punch die 49 being used in the manner above described in connection with the die 17, instead of the die 38, said dies being similarly constructed as regards such parts as are employed in the formation of the link-opening.

In an organized plant each of the above-described operations is to be carried out at separate steam-hammers or hydraulic presses, with the exception of the two operations of swaging the face-plate and punching the link-opening, or of trimming the face-plate and punching the link-opening. Either of these double operations can be effected at the same hammer, as will be readily understood.

If desired, the supporting-block or internal mandrel may be of sufficient length to fill the slot $c$ in the blank $1^c$, thereby dispensing with the use of the wedge 27.

I claim herein as my invention—

1. In a plant or apparatus for forming draw-bars, a block having a recess in its upper surface and provided with longitudinal and vertical passages, the vertical passage connecting the recess to the longitudinal passage, in combination with a separable blank-holder adapted to be secured in the recess in the block, substantially as set forth.

2. In a plant or apparatus for forming draw-bars, a separable blank holder or box, in combination with a punch and a supporting-block constructed to hold the blank-box and provided with suitable passages for the reception and removal of the metal punched out of the blank, substantially as set forth.

3. In a plant or apparatus for forming draw-bars, a separable blank holder or box consisting of similarly-constructed L-shaped blocks provided with suitable means for interlocking as against longitudinal movement in relation to each other, in combination with a supporting-block constructed to hold or support such box, substantially as set forth.

4. In an apparatus or plant for forming draw-bars, a block, 21, provided with a horizontal passage, in combination with a die resting on said block and provided with a vertical opening for the reception of the blank, and an internal supporting block or mandrel, 26, substantially as set forth.

5. In an apparatus or plant for forming draw-bars, a block, 21, in combination with a die resting on said block and provided with a vertical opening therethrough, the face of said die contiguous to the opening being suitably shaped for the formation of the rear side of the face-plate of the draw-bar, and an internal supporting block or mandrel, 26, substantially as set forth.

6. An apparatus or plant for forming draw-bars, a die having a vertical opening therethrough, the face of said die contiguous to the opening being suitably shaped for the formation of the rear side of the face-plate of the draw-bar, in combination with a block, 21, provided with a horizontal passage therethrough and a vertical opening in line with the opening in the die, filling-blocks 29, arranged in said opening, and an expansible key adapted to fit in holes in the side walls of the horizontal passage, substantially as set forth.

7. In a plant or apparatus for forming draw-bars, a die having a vertical opening therethrough, the face of said die contiguous to said opening being suitably shaped for the formation of the rear side of the face-plate of the draw-bar, and provided with abutments 20, in combination with an internal supporting block or mandrel, substantially as set forth.

8. In a plant or apparatus for forming draw-bars, a die or cutter having a vertical opening therethrough, and having its face contiguous to said opening suitably shaped for evenly supporting or adapted to fit the rear side of the face-plate of the draw-bar, the outer portions of the face of said die being cut away so as to form a cutting edge or rim, 39, in combination with a movable die or cutter, provided with an opening therethrough of the size and contour of the perimeter of the completed draw-bar, substantially as set forth.

9. In a plant or apparatus for forming draw-bars, a die-punch having in combination a stem, recessed as described, near its end, a punch located in said recess, and a movable plate having an opening therethrough, substantially as set forth.

10. In a plant or apparatus for forming draw-bars, a die-punch having in combination a stem, recessed as described, near its end, a punch located in said recess, and a movable perforated plate or punch hinged to the stem, said hinge being so constructed as to permit the movable punch to move toward the stem in a straight line, substantially as set forth.

11. In a plant or apparatus for forming draw-bars, the combination of a die or holder and punch for punching out the middle portion of the blank, a die and hammer for forming the face-plate, the die being suitably constructed for forming the rear side of the face-plate of the blank, male and female cutters for trimming the edges of the face-plate, a stationary and a movable punch for forming the link-opening in the face-plate, and a mandrel for supporting the blank during the operation of drawing the side bars or straps, substantially as set forth.

In testimony whereof I have hereunto set my hand.

JAMES H. SIMPSON.

Witnesses:
DARWIN S. WOLCOTT,
R. H. WHITTLESEY.